United States Patent
Wang et al.

(10) Patent No.: US 12,043,235 B2
(45) Date of Patent: Jul. 23, 2024

(54) AUTOMATIC BRAKING SYSTEM

(71) Applicant: Toyota Motor Engineering & Manufacturing North America, Inc., Plano, TX (US)

(72) Inventors: Timothy Wang, Ann Arbor, MI (US); Roger Akira Kyle, Frisco, TX (US); Bryan E. Yamasaki, Ypsilanti, MI (US); Justin K. Shen, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 268 days.

(21) Appl. No.: 17/696,515

(22) Filed: Mar. 16, 2022

(65) Prior Publication Data
US 2023/0294647 A1   Sep. 21, 2023

(51) Int. Cl.
*B60T 7/12* (2006.01)
*B60T 8/171* (2006.01)

(52) U.S. Cl.
CPC ............... *B60T 7/12* (2013.01); *B60T 8/171* (2013.01); *B60T 2210/30* (2013.01); *B60T 2220/04* (2013.01); *B60T 2250/04* (2013.01)

(58) Field of Classification Search
CPC ........ B60T 7/12; B60T 8/171; B60T 2210/30; B60T 2220/04; B60T 2250/04
See application file for complete search history.

(56) References Cited

U.S. PATENT DOCUMENTS

| 10,300,892 | B2 | 5/2019 | Delannoye |
| 10,969,005 | B2 | 4/2021 | Nakade |
| 2024/0026647 | A1* | 1/2024 | Ikeda ............... B60T 13/22 |

FOREIGN PATENT DOCUMENTS

| CN | 106715978 A | 5/2017 |
| JP | 2017122495 A | 7/2017 |

* cited by examiner

*Primary Examiner* — Jacob M Amick
(74) *Attorney, Agent, or Firm* — Christopher G. Darrow; Darrow Mustafa PC

(57) ABSTRACT

An automatic braking system for a vehicle includes a sensor system configured to detect the previous speed of the vehicle, occupancy of a driver's seat of the vehicle, and an input to at least one of an accelerator pedal of the vehicle and a brake pedal of the vehicle. The automatic braking system also includes a control module communicatively connected to the sensor system and configured to automatically brake the vehicle when the vehicle was previously stopped, the driver's seat is occupied, and there is no input to the accelerator pedal or the brake pedal.

17 Claims, 2 Drawing Sheets

AUTOMATIC BRAKING SYSTEM

TECHNICAL FIELD

The embodiments disclosed herein relate to a braking system for a vehicle and, more particularly, to systems and methods for automatically applying the brakes of the vehicle.

BACKGROUND

As a part of conventional vehicle systems, a vehicle may include a braking system. The braking system is operable to perform one or more braking functions such as slowing and/or braking the wheels of the vehicle or otherwise stopping the vehicle. The braking system includes a brake pedal, which, when depressed by the driver, causes the braking system to slow and/or stop the vehicle.

SUMMARY

Disclosed herein are embodiments of an automatic braking system for a vehicle.

In one aspect, an automatic braking system for a vehicle includes a sensor system configured to detect the previous speed of the vehicle, occupancy of a driver's seat of the vehicle, and an input to at least one of an accelerator pedal of the vehicle and a brake pedal of the vehicle. The automatic braking system further includes a control module communicatively connected to the sensor system and configured to automatically brake the vehicle when the vehicle was previously stopped, the driver's seat is occupied, and there is no input to the accelerator pedal or the brake pedal.

In another aspect, a method for operating an automatic braking system of a vehicle includes detecting whether the vehicle was previously stopped, whether a driver's seat of the vehicle is occupied, and whether there is an input to at least one of an accelerator pedal of the vehicle and a brake pedal of the vehicle. The method further includes automatically braking the vehicle when the vehicle was previously stopped, the driver's seat is occupied, and there is no input to the accelerator pedal or the brake pedal.

In yet another aspect, a non-transitory computer-readable medium includes instructions that, when executed by a processor, cause the processor to detect, using sensor data about a vehicle, whether the vehicle was previously stopped, whether a driver's seat of the vehicle is occupied, and whether there is an input to at least one of an accelerator pedal of the vehicle and a brake pedal of the vehicle. The instructions further cause the processor to automatically brake the vehicle when the vehicle was previously stopped, the driver's seat is occupied, and there is no input to the accelerator pedal or the brake pedal.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an automatic braking system for a vehicle. The automatic braking system is configured to automatically brake the vehicle based on sensed criteria about the vehicle and a driver of the vehicle to prevent unintended rolling of the vehicle. For example, the automatic braking system can be configured to automatically brake the vehicle when the vehicle was previously stopped, the driver's seat is occupied, and there is no input to an accelerator pedal or a brake pedal of the vehicle. This may occur when the driver intends to stop the vehicle, but lifts his or her foot from the pedals, for example, if he or she becomes distracted.

Figure 1:
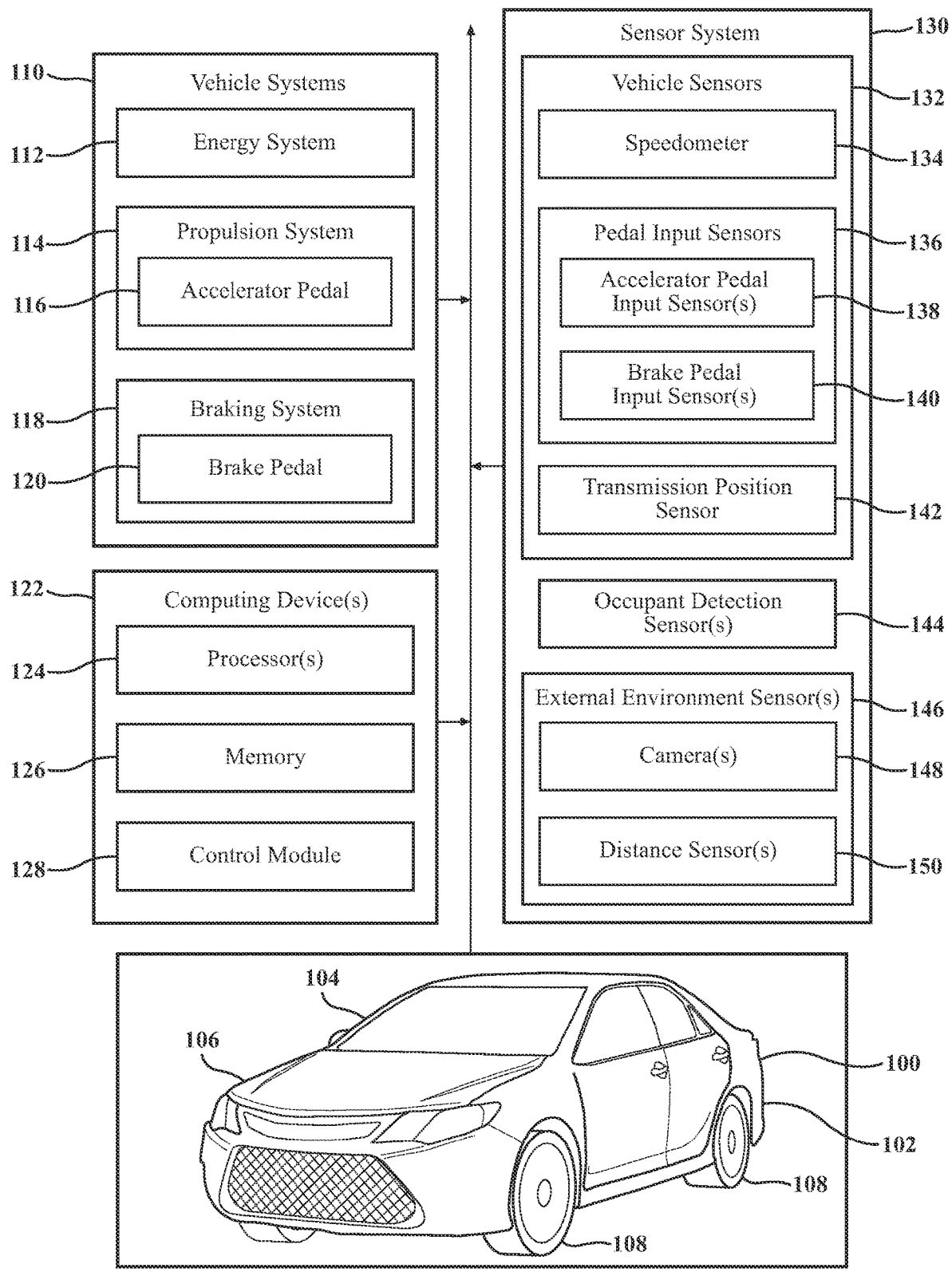
FIG. 1 is an example of an automatic braking system of a vehicle.

A representative passenger vehicle 100 is shown in FIG. 1. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 includes an exterior 102 and a number of interior compartments. The compartments include a passenger compartment 104 and an engine compartment 106. Among other things, the vehicle 100 may include seats, a dash assembly, an instrument panel, controls and the like housed in the passenger compartment 104. Additionally, the vehicle 100 may include an engine, a motor, a transmission, and the like, as well as other powertrain components, such as wheels 108, housed in the engine compartment 106 and elsewhere in the vehicle 100. The wheels 108 support the remainder of the vehicle 100 on the ground. One, some, or all of the wheels 108 are powered by the remainder of the powertrain components to drive the vehicle 100 along the ground.

The vehicle 100 includes one or more vehicle systems 110 operable to perform vehicle functions. In addition to the vehicle systems 110, the vehicle 100 includes a sensor system 130, as well as one or more processor(s) 124, a memory 126, and a control module 128 to which the vehicle systems 110 and the sensor system 130 are communicatively connected. The sensor system 130 is operable to detect information about the vehicle 100. The processor(s) 124, the memory 126, and the control module 128 together serve as one or more computing devices 122 whose control module is employable to orchestrate the operation of the vehicle 100, in whole or in part. Specifically, the control module 128 operates the vehicle systems 110 based on information about the vehicle 100. Accordingly, as a prerequisite to operating the vehicle systems 110, the control module 128 gathers information about the vehicle 100, including the information about the vehicle 100 detected by the sensor system 130. The control module 128 then evaluates the information about the vehicle 100 and operates the vehicle systems 110 based on its evaluation.

The vehicle systems 110 are part of, mounted to, or otherwise supported by the vehicle 100. The vehicle systems 110 may be housed, in whole or in part, in any combination of the passenger compartment 104, the engine compartment 106, or elsewhere in the vehicle 100. Each vehicle system 110 includes one or more vehicle elements. On behalf of the vehicle system 110 to which it belongs, each vehicle element is operable to perform in whole or in part, any combination of vehicle functions with which the vehicle system 110 is associated. It will be understood that the vehicle elements, as well as the vehicle systems 110 to which they belong, may but need not be mutually distinct.

The vehicle systems 110 include an energy system 112 and a propulsion system 114. The energy system 112 and the propulsion system 114 are connected to one another. Moreover, the drivetrain is mechanically connected to the propulsion system 114. The propulsion system 114 and the drivetrain together serve as a powertrain for the vehicle 100. The energy system 112 is operable to perform one or more energy functions, including but not limited to storing and otherwise handling energy. The propulsion system 114 is operable to perform one or more propulsion functions using energy from the energy system 112, including but not limited to powering the wheels 108. The propulsion system 114 includes an accelerator pedal 116, which, when depressed by a driver of the vehicle 100, causes the propulsion system 114 to propel the vehicle 100. The vehicle systems 110 also include a braking system 118. The braking system 118 is operable to perform one or more braking functions such as braking the wheels 108 or otherwise slowing the wheels 108 or stopping the vehicle 100. The braking system 118 includes a brake pedal 120, which, when depressed by the driver, causes the braking system 118 to slow and/or stop the vehicle 100.

As part of the sensor system 130, the vehicle 100 includes vehicle sensors 132. The vehicle sensors 132 monitor the vehicle 100 in real-time. The vehicle sensors 132, on behalf of the sensor system 130, are operable to detect information about the vehicle 100, including information about the operation of the vehicle 100. For example, the vehicle sensors 132 can be configured to detect and/or acquire data about various operating parameters of the vehicle 100. The vehicle sensors 132 can include a speedometer 134 that is configured to determine the speed of the vehicle 100.

The vehicle sensors 132 can also include pedal input sensors 136. The pedal input sensors 136 can include one or more accelerator pedal input sensors 138 and one or more brake pedal input sensors 140. The pedal input sensors 136 can be any suitable type of pedal input sensors. For example the pedal input sensors 136 can be position sensors to sense the position of the accelerator pedal 116 and/or the brake pedal 120, pressure sensors to sense the pressure applied to the accelerator pedal 116 and/or the brake pedal 120, or rotational sensors to sense the rotation of the accelerator pedal 116 and/or the brake pedal 120. In another example, the pedal input sensors 136 can be one or more cameras and/or distance sensors configured to sense whether a driver of the vehicle 100 has a foot on or near the accelerator pedal 116 or the brake pedal 120. The vehicle sensors 132 can also include a transmission position sensor 142. The transmission position sensor 142 can be configured to determine whether the vehicle 100 is in drive, park, reverse, or neutral.

The vehicle sensors 132 can also include one or more occupant detection sensors 144. For example, the occupant detection sensors 144 can be configured to determine when the driver's seat is occupied and when the driver's seat is not occupied. More specifically, the occupant detection sensor(s) 144 can include one or more sensors to detect the occupancy of a driver's seat located in the passenger compartment 104 of the vehicle 100. The occupant detection sensor(s) 144 can be any suitable type of sensor(s). For example, the occupant detection sensor(s) 144 can be one or more weight sensor(s) located within the driver's seat. In another example, the occupant detection sensor(s) 144 can be one or more camera(s) located in the cabin of the vehicle 100 and configured to detect the occupancy of the driver's seat.

The sensor system 130 can also include external environment sensors 146. The external environment sensors 146 can be configured to detect, determine, assess, monitor, measure, quantify, acquire, and/or sense data or information about the external environment in which the vehicle 100 is located or one or more portions thereof. The external environment sensors 146 can include one or more cameras 148, such as wide-angle cameras and/or fish-eye cameras. The external environment sensors 146 can also include one or more distance sensors 150, such as LIDAR or radar sensors, to detect objects near the vehicle 100. The external environment sensors 146 can be located on the exterior 102 of the vehicle 100 and/or can be located in any other suitable location on the vehicle 100. Using the external environment sensors 146, the control module 128 can determine information about the external environment of the vehicle 100. For example, the control module 128 can determine whether the driver is in the process of parking the vehicle 100 or maneuvering the vehicle 100 out of a parking spot, by detecting, for example, parking spot markers on the ground or by detecting a wall or a curb near the vehicle 100.

The vehicle systems 110, the sensor system 130, the processor(s) 124, the memory 126, and the control module 128 may be leveraged to implement an automatic braking system based on the detection of an input to the accelerator pedal 116 or the brake pedal 120 and the occupancy of the driver's seat. In some instances, the driver may be in a hurry to exit the vehicle 100 and may forget to put the transmission of the vehicle 100 in park. In these instances, the transmission may be in drive, neutral, or reverse, and the driver may be in the process of exiting the vehicle 100, and thus the driver's seat may be unoccupied. In other instances, however, the driver may be in the vehicle 100, but for other reasons, might forget to apply the brakes. For example, the driver may be distracted and not paying attention to the surroundings of the vehicle 100. Accordingly, the automatic braking system can be configured to prevent the vehicle 100 from rolling when the driver forgets to put the transmission in park.

For example, the driver may stop the vehicle 100 at a stoplight but may be distracted and lift his or her foot from the brake pedal 120. In this example, the control module 128 can be configured to determine that the vehicle 100 was previously stopped, that the driver's seat is occupied, and that there is no input to the accelerator pedal 116 or the brake pedal 120 and can be configured to automatically brake the vehicle 100 to prevent the vehicle 100 from rolling. Additionally, the control module 128 can be configured to check the position of the transmission of the vehicle 100. If the transmission is in park, the control module 128 can determine that the brakes do not need to be applied. For example, if the driver stops the vehicle 100 in a parking spot, puts the transmission in park, and takes his or her foot off of the brake pedal 120, the control module 128 will not apply the brakes. However, if the transmission is not in park, the vehicle 100 was previously stopped, and the driver's seat is not occupied, the control module 128 is configured to automatically brake the vehicle 100.

In some instances, the driver of the vehicle 100 may be exiting a parking spot and may not have a foot on either the accelerator pedal 116 or the brake pedal 120 to let the vehicle 100 coast. In these situations, the driver will not want the vehicle 100 to automatically brake. Accordingly, the control module 128 can be configured to determine, using information from the external environment sensors 146 and/or the transmission position sensor 142, whether the vehicle 100 is exiting a parking space. For example, the control module 128 can detect parking lines and/or other markers near the vehicle, detect a wall or a curb near the vehicle 100, and/or detect that the transmission is in reverse. If the vehicle 100 is exiting a parking space, the driver's seat is occupied, there is no input to the accelerator pedal 116 or the brake pedal 120, and the vehicle 100 was previously stopped, the control module 128 will not automatically brake the vehicle 100 and will allow the vehicle 100 to roll. If the vehicle is not exiting a parking space, the driver's seat is occupied, there is no input to the accelerator pedal 116 or the brake pedal 120, and the vehicle 100 was previously stopped, the control module 128 will automatically brake the vehicle 100.

Figure 2:
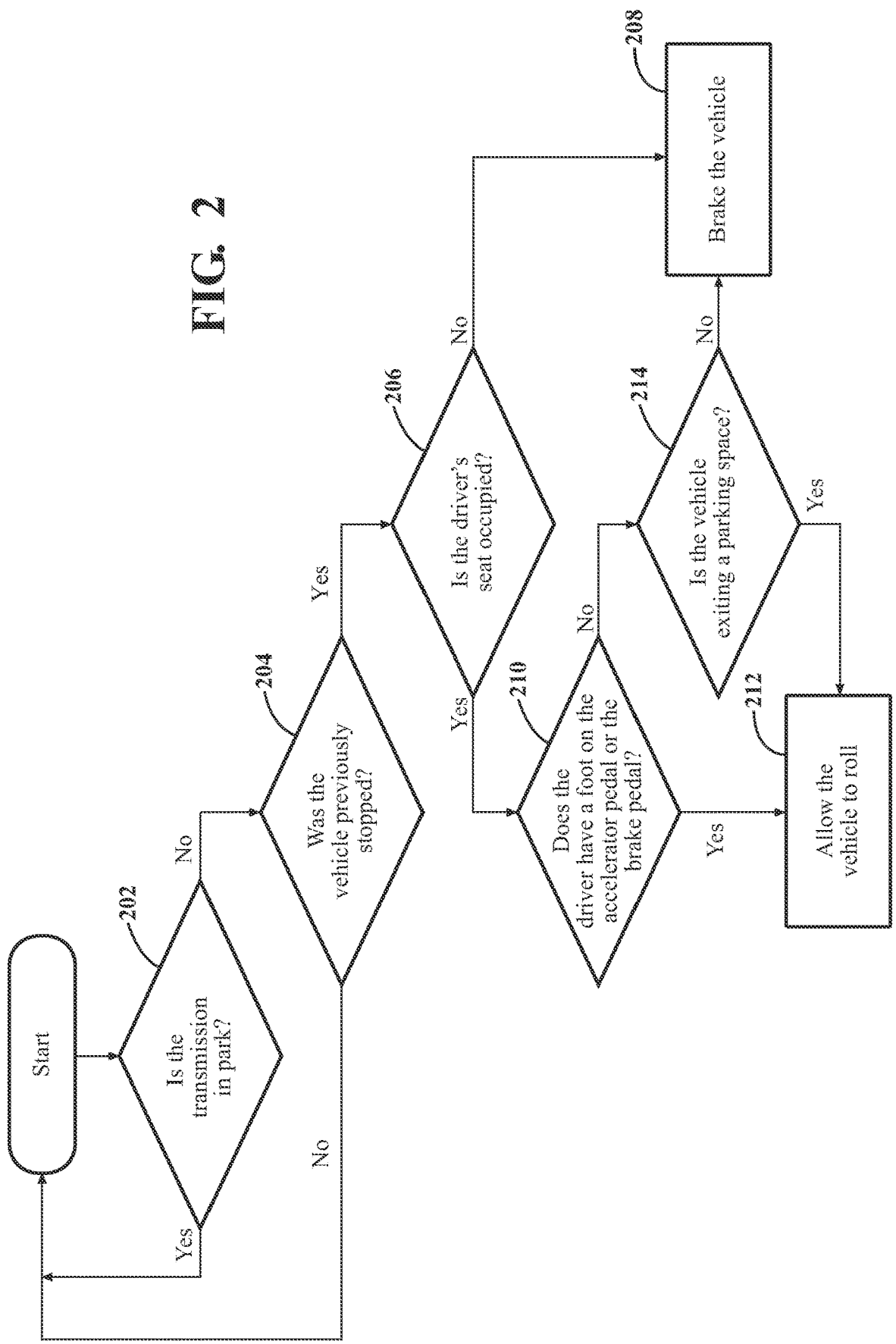
FIG. 2 is an example of a method of operating the automatic braking system.

The operations of a method 200 for operating the automatic braking system are shown in FIG. 2. The method 200 described may be applicable to the arrangements described above, but it is to be understood that the method 200 can be carried out with other suitable systems and arrangements. Moreover, the method 200 may include other steps not shown here, and the method 200 is not limited to including every step shown. The blocks illustrated here as part of the method 200 are not limited to the particular chronological order. Indeed, some of the blocks may be performed in a different order than what is shown and/or at least some of the blocks shown can occur simultaneously.

According to the method 200, the control module 128 operates the automatic braking system of the vehicle 100 based on various criteria sensed about the vehicle 100 and/or the driver. The method 200 begins in operation 202. In operation 202, The control module 128 can determine whether the transmission of the vehicle 100 is in park (e.g., the control module 128 can detect the position of the transmission of the vehicle 100). This can be done using information and/or data from the transmission position sensor 142. If the transmission is in park, the method 200 can start over. If the transmission is not in park, the method 200 will continue to operation 204.

In operation 204, the control module 128 can determine whether the vehicle 100 was previously stopped (e.g., the control module 128 can determine that the previous speed of the vehicle 100 was about 0 mph/kph). This can be done using information and/or data from the speedometer 134. If the vehicle 100 was not previously stopped (e.g., the vehicle 100 is in motion), the method 200 can start over. If the vehicle 100 was previously stopped, the control module 128 can then determine, in operation 206, whether the driver's seat is occupied. This can be done using information and/or data from the occupant detection sensor(s) 144. If the driver's seat is not occupied, the method 200 will continue to operation 208, in which the control module 128 will automatically brake the vehicle 100, for example, by operating the braking system 118 to apply the brakes.

Referring back to operation 206, if the driver's seat is occupied, the method 200 can continue to operation 210. In operation 210, the control module 128 can determine whether there is an input to the accelerator pedal 116 or the brake pedal 120. For example, the control module 128 can determine whether the driver has a foot on the accelerator pedal 116 or the brake pedal 120. This can be done using the accelerator pedal input sensor(s) 138 and the brake pedal input sensor(s) 140. If the driver has a foot on the accelerator pedal 116 or the brake pedal 120, then method will continue to operation 212, in which the control module 128 will not operate the braking system 118 and will allow the vehicle 100 to roll or otherwise respond to the driver's input to the accelerator pedal 116 or the brake pedal 120. If the driver does not have a foot on the accelerator pedal 116 or the brake pedal 120, the method 200 can proceed to operation 214.

In operation 214, the control module 128 can determine whether the vehicle 100 is exiting a parking space. This can be done using the external environment sensors 146. If the vehicle 100 is exiting a parking space, the method 200 will proceed to operation 212, in which the control module 128 will allow the vehicle 100 to roll. If the vehicle 100 is not exiting a parking space, the method 200 will proceed to operation 208, in which the control module 128 will automatically brake the vehicle 100, for example, by operating the braking system 118 to apply the brakes.

With reference once again to FIG. 1, as noted above, the processor(s) 124, the memory 126, and the control module 128 together serve as the computing device(s) 122 whose control module 128 orchestrates the operation of the vehicle 100, including but not limited to the operation of the vehicle systems 110. The control module 128 may be a global control module. Relatedly, as part of a central control system, the vehicle 100 may include a global control unit (GCU) with which the control module 128 is communicatively connected. Alternatively, the control module 128 may be a global control module. Relatedly, as part of a central control system, the vehicle 100 may include a global control unit (GCU) to which the control module 128 belongs. Although the vehicle 100, as shown, includes one control module 128, it will be understood that this disclosure is applicable in principle to otherwise similar vehicles including multiple control modules.

The processor(s) 124 may be any components configured to execute any of the processes described herein or any form of instructions to carry out such processes or cause such processes to be performed. The processor(s) 124 may be implemented with one or more general-purpose or special-purpose processors. Examples of suitable processors include microprocessors, microcontrollers, digital signal processors or other forms of circuitry that execute software. Other examples of suitable processors include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor(s) 124 may include at least one hardware circuit (e.g., an integrated circuit) configured to carry out instructions contained in program code. In arrangements where there are multiple processor(s) 124, the processor(s) 124 may work independently from each other or in combination with one another.

The memory 126 may be a non-transitory computer readable medium. The memory 126 may include volatile or nonvolatile memory, or both. Examples of suitable memory include random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination of these. The memory 126 includes stored instructions in program code. Such instructions are executable by the processor(s) 124 or the control module 128. The memory 126 may be part of the processor(s) 124 or the control module 128 or may be communicatively connected the processor(s) 124 or the control module 128.

Generally speaking, the control module 128 includes instructions that may be executed by the processor(s) 124. The control module 128 may be implemented as computer readable program code that, when executed by the processor(s) 124, execute one or more processes described herein. Such computer readable program code may be stored in the memory 126. The control module 128 may be part of the processor(s) or may be communicatively connected the processor(s) 124.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automatic braking system for a vehicle, comprising:
   a sensor system configured to detect a previous speed of the vehicle, occupancy of a driver's seat of the vehicle, a position of a transmission of the vehicle, and an input to at least one of an accelerator pedal of the vehicle and a brake pedal of the vehicle; and
   a control module communicatively connected to the sensor system and configured to automatically brake the vehicle when the vehicle was previously stopped, the driver's seat is occupied, and there is no input to the accelerator pedal or the brake pedal, and to automatically brake the vehicle when the vehicle was previously stopped, the driver's seat is not occupied, and the transmission is not in park.

2. The automatic braking system of claim 1, wherein the sensor system is further configured to detect information about an external environment of the vehicle, and wherein the control module is configured to determine, using the information about the external environment, whether the vehicle is exiting a parking space.

3. The automatic braking system of claim 2, wherein the control module is configured to automatically brake the vehicle when the vehicle was previously stopped, the driver's seat is occupied, there is no input to the accelerator pedal or the brake pedal, and the vehicle is not exiting a parking space.

4. The automatic braking system of claim 2, wherein the control module is configured to allow the vehicle to roll when the vehicle was previously stopped, the driver's seat is occupied, there is no input to the accelerator pedal or the brake pedal, and the vehicle is exiting a parking space.

5. The automatic braking system of claim 1, wherein the control module is configured to allow the vehicle to roll when the vehicle was previously stopped, the driver's seat is occupied, and there is an input to the accelerator pedal or the brake pedal.

6. The automatic braking system of claim 1, wherein the sensor system includes vehicle sensors, and wherein the vehicle sensors include a speedometer configured to detect the previous speed of the vehicle, an occupant detection sensor configured to detect occupancy of the driver's seat, the occupant detection sensor being at least one of a weight sensor and a camera, an accelerator pedal input sensor configured to detect an input to the accelerator pedal, and a brake pedal input sensor configured to detect an input to the brake pedal.

7. The automatic braking system of claim 1, wherein the sensor system includes vehicle sensors, and wherein the vehicle sensors include a transmission position sensor configured to detect the position of a transmission of the vehicle.

8. The automatic braking system of claim 2, wherein the sensor system includes external environment sensors configured to detect the information about the external environment, and wherein the external environment sensors include at least one of a camera and a distance sensor.

9. A method for operating an automatic braking system of a vehicle, comprising:
   detecting whether the vehicle was previously stopped;
   detecting whether a driver's seat of the vehicle is occupied;
   detecting whether there is an input to at least one of an accelerator pedal of the vehicle and a brake pedal of the vehicle;
   detecting a position of a transmission of the vehicle;
   automatically braking the vehicle when the vehicle was previously stopped, the driver's seat is occupied, and there is no input to the accelerator pedal or the brake pedal; and
   automatically braking the vehicle when the vehicle was previously stopped, the driver's seat is not occupied, and the transmission is not in park.

10. The method of claim 9, further comprising:
    detecting information about an external environment of the vehicle; and
    determining, using the information about the external environment of the vehicle, whether the vehicle is exiting a parking space.

11. The method of claim 10, further comprising:
    automatically braking the vehicle when the vehicle was previously stopped, the driver's seat is occupied, there is no input to the accelerator pedal or the brake pedal, and the vehicle is not exiting a parking space.

12. The method of claim 10, further comprising:
    allowing the vehicle to roll when the vehicle was previously stopped, the driver's seat is occupied, there is no input to the accelerator pedal or the brake pedal, and the vehicle is exiting a parking space.

13. The method of claim 9, further comprising:
    allowing the vehicle to roll when the vehicle was previously stopped, the driver's seat is occupied, and there is an input to the accelerator pedal or the brake pedal.

14. A non-transitory computer-readable medium including instructions that, when executed by a processor, cause the processor to:
    detect, using sensor data about a vehicle:
       whether the vehicle was previously stopped;
       whether a driver's seat of the vehicle is occupied;
       whether there is an input to at least one of an accelerator pedal of the vehicle and a brake pedal of the vehicle; and
       a position of a transmission of the vehicle;
    automatically brake the vehicle when the vehicle was previously stopped, the driver's seat is occupied, and there is no input to the accelerator pedal or the brake pedal; and
    automatically braking the vehicle when the vehicle was previously stopped, the driver's seat is not occupied, and the transmission is not in park.

15. The non-transitory computer-readable medium of claim 14, wherein the instructions further cause the processor to:
    detect information about an external environment of the vehicle; and determine, using the information about the external environment of the vehicle, whether the vehicle is exiting a parking space.

16. The non-transitory computer-readable medium of claim 15, wherein the instructions further cause the processor to:

automatically brake the vehicle when the vehicle was previously stopped, the driver's seat is occupied, there is no input to the accelerator pedal or the brake pedal, and the vehicle is not exiting a parking space.

17. The non-transitory computer-readable medium of claim 15, wherein the instructions further cause the processor to:

allow the vehicle to roll when the vehicle was previously stopped, the driver's seat is occupied, there is no input to the accelerator pedal or the brake pedal, and the vehicle is exiting a parking space.

* * * * *